United States Patent
Liu et al.

(10) Patent No.: US 10,989,096 B2
(45) Date of Patent: Apr. 27, 2021

(54) CLOSE COUPLED SINGLE MODULE AFTERTREATMENT SYSTEM

(71) Applicant: Cummins Emission Solutions, Inc., Columbus, IN (US)

(72) Inventors: Yi Liu, Bloomington, IN (US); Qiang Liu, Columbus, IN (US); Arvind V. Harinath, Columbus, IN (US); Changsheng C. Su, Columbus, IN (US); Behnam Bahrami, Indianapolis, IN (US); A. Carl McDonald, Greenwood, IN (US); Stephen M. Holl, Columbus, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 0 days.

(21) Appl. No.: 16/525,114

(22) Filed: Jul. 29, 2019

(65) Prior Publication Data

US 2019/0353077 A1 Nov. 21, 2019

Related U.S. Application Data

(62) Division of application No. 15/539,954, filed as application No. PCT/US2015/067324 on Dec. 22, 2015, now Pat. No. 10,436,097.

(Continued)

(51) Int. Cl.
*H01L 21/768* (2006.01)
*F01N 13/00* (2010.01)
(Continued)

(52) U.S. Cl.
CPC ......... *F01N 13/0097* (2014.06); *F01N 3/021* (2013.01); *F01N 3/103* (2013.01);
(Continued)

(58) Field of Classification Search
CPC .... F01N 13/0097; F01N 3/2892; F01N 3/103; F01N 3/2066; F01N 3/021; F01N 2560/06; F01N 2610/02
(Continued)

(56) References Cited

U.S. PATENT DOCUMENTS

| 3,247,665 A | 4/1966 | Behrens |
| 4,673,423 A | 6/1987 | Yumlu |

(Continued)

FOREIGN PATENT DOCUMENTS

| CN | 2537449 Y | 2/2003 |
| CN | 102527231 A | 7/2012 |

(Continued)

OTHER PUBLICATIONS

Non-Final Office Action cited for U.S. Appl. No. 15/539,010 dated Aug. 1, 2019, 41 pages.

(Continued)

*Primary Examiner* — Tom P Duong
(74) *Attorney, Agent, or Firm* — Foley & Lardner LLP

(57) ABSTRACT

An aftertreatment system includes a filtration and reduction unit. The filtration and reduction unit comprises a housing defining an internal volume. A filter is disposed in the internal volume and is configured to substantially remove particulates from the exhaust gas. A selective catalytic reduction system is disposed in the internal volume downstream of the filter and is configured to selectively reduce a portion of the exhaust gas. A first catalyst is formulated to oxidize at least a portion of the exhaust gas. An intake pipe is disposed upstream of the filtration and reduction unit and configured to communicate the exhaust gas o the filtration and reduction unit. The first catalyst is disposed in the intake pipe. An exhaust pipe is disposed downstream of the filtration and reduction unit.

13 Claims, 4 Drawing Sheets

Related U.S. Application Data

(60) Provisional application No. 62/098,653, filed on Dec. 31, 2014.

(51) Int. Cl.
| | |
|---|---|
| *F01N 3/10* | (2006.01) |
| *F01N 3/20* | (2006.01) |
| *F01N 3/28* | (2006.01) |
| *F01N 3/021* | (2006.01) |

(52) U.S. Cl.
CPC .......... *F01N 3/106* (2013.01); *F01N 3/2066* (2013.01); *F01N 3/2892* (2013.01); *F01N 2240/20* (2013.01); *F01N 2560/06* (2013.01); *F01N 2610/02* (2013.01); *Y02T 10/12* (2013.01)

(58) Field of Classification Search
USPC ......................................... 422/168, 177, 180
See application file for complete search history.

(56) References Cited

U.S. PATENT DOCUMENTS

| | | | |
|---|---|---|---|
| 4,881,959 A | 11/1989 | Kono et al. | |
| 5,043,146 A | 8/1991 | Ishikawa et al. | |
| D320,837 S | 10/1991 | Loefke et al. | |
| 5,137,656 A | 8/1992 | Conner | |
| 5,169,604 A | 12/1992 | Crothers, Jr. | |
| 5,224,621 A | 7/1993 | Cannan et al. | |
| 5,597,948 A | 1/1997 | Sharp | |
| 5,611,832 A | 3/1997 | Suzuki et al. | |
| 5,869,010 A | 2/1999 | Langer | |
| 6,475,944 B1 | 11/2002 | Yang et al. | |
| 6,584,768 B1 | 7/2003 | Hecker et al. | |
| D590,419 S | 4/2009 | Duffek et al. | |
| D607,536 S | 1/2010 | Filo | |
| 8,091,353 B2 | 1/2012 | Nakahira et al. | |
| 8,341,949 B2 | 1/2013 | Tarabulski | |
| 8,359,848 B2 | 1/2013 | Bruza et al. | |
| 8,540,793 B2 | 9/2013 | Kasaoka et al. | |
| 8,549,847 B2 | 10/2013 | Kamiya et al. | |
| 8,609,047 B2 | 12/2013 | Dotzel et al. | |
| D702,735 S | 4/2014 | Sandou et al. | |
| 8,756,913 B2 | 6/2014 | Liu et al. | |
| D757,919 S | 5/2016 | Kimura | |
| D794,100 S | 8/2017 | McDonald et al. | |
| 9,745,883 B2 | 8/2017 | Quadri et al. | |
| D798,992 S | 10/2017 | Rowsey | |
| D809,577 S | 2/2018 | McDonald et al. | |
| D819,778 S | 6/2018 | Polacek et al. | |
| 10,092,879 B2 | 10/2018 | Zoran et al. | |
| 2003/0221424 A1 | 12/2003 | Woerner et al. | |
| 2004/0159657 A1 | 8/2004 | Chism et al. | |
| 2006/0266022 A1 | 11/2006 | Woerner et al. | |
| 2007/0039316 A1 | 2/2007 | Bosanec et al. | |
| 2007/0051095 A1* | 3/2007 | Lutz .................... F02M 26/35 60/279 | |
| 2007/0169452 A1 | 7/2007 | Grimm et al. | |
| 2008/0060351 A1 | 3/2008 | Pawson et al. | |
| 2008/0297362 A1 | 12/2008 | Veenstra | |
| 2009/0044522 A1 | 2/2009 | Nakahira et al. | |
| 2009/0084094 A1 | 4/2009 | Goss et al. | |
| 2009/0136387 A1 | 5/2009 | Picton et al. | |
| 2009/0260351 A1 | 10/2009 | Cremeens et al. | |
| 2009/0313979 A1 | 12/2009 | Kowada | |
| 2010/0223916 A1 | 9/2010 | Hayashi et al. | |
| 2010/0242451 A1 | 9/2010 | Werni et al. | |
| 2010/0300082 A1 | 12/2010 | Zhang | |
| 2011/0023471 A1 | 2/2011 | Werni et al. | |
| 2011/0023472 A1 | 2/2011 | Saito et al. | |
| 2011/0030351 A1* | 2/2011 | Kato ...................... F01N 3/2066 60/297 | |
| 2011/0036063 A1 | 2/2011 | Kumar | |
| 2011/0047973 A1 | 3/2011 | Wilhelm et al. | |
| 2011/0052454 A1* | 3/2011 | Kato ...................... F01N 3/035 422/171 | |
| 2011/0088375 A1 | 4/2011 | Suzuki et al. | |
| 2011/0094206 A1 | 4/2011 | Liu et al. | |
| 2011/0099978 A1 | 5/2011 | Davidson et al. | |
| 2011/0167775 A1 | 7/2011 | Mitsuda | |
| 2011/0271660 A1 | 11/2011 | Gonze et al. | |
| 2011/0283687 A1 | 11/2011 | Dobler et al. | |
| 2011/0311928 A1 | 12/2011 | Zimmer et al. | |
| 2012/0004863 A1 | 1/2012 | Ardanese et al. | |
| 2012/0167558 A1 | 7/2012 | Svihla et al. | |
| 2012/0210697 A1 | 8/2012 | Garimella et al. | |
| 2013/0039817 A1 | 2/2013 | Fukuda | |
| 2013/0086894 A1 | 4/2013 | Wikaryasz et al. | |
| 2013/0097978 A1 | 4/2013 | Nagasaka et al. | |
| 2013/0125524 A1 | 5/2013 | Plummer et al. | |
| 2013/0213008 A1 | 8/2013 | Kumar et al. | |
| 2013/0213013 A1 | 8/2013 | Mitchell et al. | |
| 2013/0232958 A1* | 9/2013 | Ancimer ................ F01N 3/10 60/301 | |
| 2013/0270278 A1 | 10/2013 | Schneider et al. | |
| 2014/0007562 A1 | 1/2014 | Justin | |
| 2014/0150450 A1 | 6/2014 | Golin et al. | |
| 2014/0208723 A1 | 7/2014 | Baig et al. | |
| 2014/0260202 A1 | 9/2014 | Bays et al. | |
| 2014/0262590 A1 | 9/2014 | Daborn et al. | |
| 2014/0331644 A1 | 11/2014 | Kumar et al. | |
| 2014/0363358 A1 | 12/2014 | Udd et al. | |
| 2014/0373721 A1 | 12/2014 | Sandou et al. | |
| 2015/0000389 A1 | 1/2015 | Runde et al. | |
| 2015/0128566 A1* | 5/2015 | Osumi .................. F01N 3/0253 60/274 | |
| 2015/0224870 A1 | 8/2015 | Shin et al. | |
| 2016/0040578 A1 | 2/2016 | Lorenz et al. | |
| 2016/0069239 A1 | 3/2016 | Freeman et al. | |
| 2016/0076430 A1 | 3/2016 | Freeman et al. | |
| 2016/0115847 A1 | 4/2016 | Chapman et al. | |
| 2016/0245207 A1 | 8/2016 | Ball et al. | |
| 2016/0326931 A1 | 11/2016 | Freeman et al. | |
| 2016/0369940 A1 | 12/2016 | Patil et al. | |
| 2017/0009683 A1 | 1/2017 | Mitsuda | |
| 2017/0036165 A1 | 2/2017 | Schmid et al. | |
| 2017/0043295 A1 | 2/2017 | Minezawa et al. | |
| 2017/0074146 A1 | 3/2017 | Maletic et al. | |
| 2017/0089248 A1 | 3/2017 | Evans et al. | |
| 2017/0327273 A1 | 11/2017 | Lee et al. | |
| 2017/0370262 A1 | 12/2017 | Zoran et al. | |
| 2018/0290826 A1 | 10/2018 | Polacek et al. | |

FOREIGN PATENT DOCUMENTS

| | | |
|---|---|---|
| DE | 10 2013 203 580 A1 | 9/2014 |
| EM | 002840355-001 | 10/2015 |
| EM | 002840355-002 | 10/2015 |
| EM | 002840355-003 | 10/2015 |
| EM | 002840355-004 | 10/2015 |
| EP | 2554809 | 2/2013 |
| EP | 2 808 512 A1 | 12/2013 |
| GB | 2 465 151 A | 5/2010 |
| JP | 2009-013927 A | 1/2009 |
| WO | WO-2011/118527 A1 | 9/2011 |
| WO | WO-2016/109320 A1 | 7/2016 |
| WO | WO-2016/109321 A1 | 7/2016 |
| WO | WO-2016/109323 A1 | 7/2016 |

OTHER PUBLICATIONS

Final Office Action issued in U.S. Appl. No. 16/124,555 dated Aug. 20, 2019, 14 pages.
International Search Report & Written Opinion for PCT/US2015/067302, dated Mar. 11, 2016, 9 pages.
International Search Report & Written Opinion for PCT/US2015/067317, dated Apr. 22, 2016, 9 pages.
International Search Report & Written Opinion for PCT/US2015/067324, dated Feb. 23, 2016, 7 pages.
Office Action for Chinese Patent App. No. 201580070306.7, dated Oct. 31, 2018, 15 pages (with translation).

(56) References Cited

OTHER PUBLICATIONS

Office Action for U.S. Appl. No. 15/539,886, dated Mar. 1, 2018, 10 pages.
Final Office Action for U.S. Appl. No. 15/539,010, dated Jan. 27, 2020, pp. 1-34.
Examination Report for U.K. Patent App. No. 1708391.6 dated Mar. 26, 2020, 2 pages.
Examination Report issued for UK Patent Application No. GB 1710437.3 dated Sep. 9, 2020, 2 pages.
Office action cited in U.S. Appl. No. 16/433,902, dated Jul. 22, 2020, 31 pages.
Examination Report in U.K. Patent App. No. 1710437.3 dated Mar. 19, 2020, 3 pages.

* cited by examiner

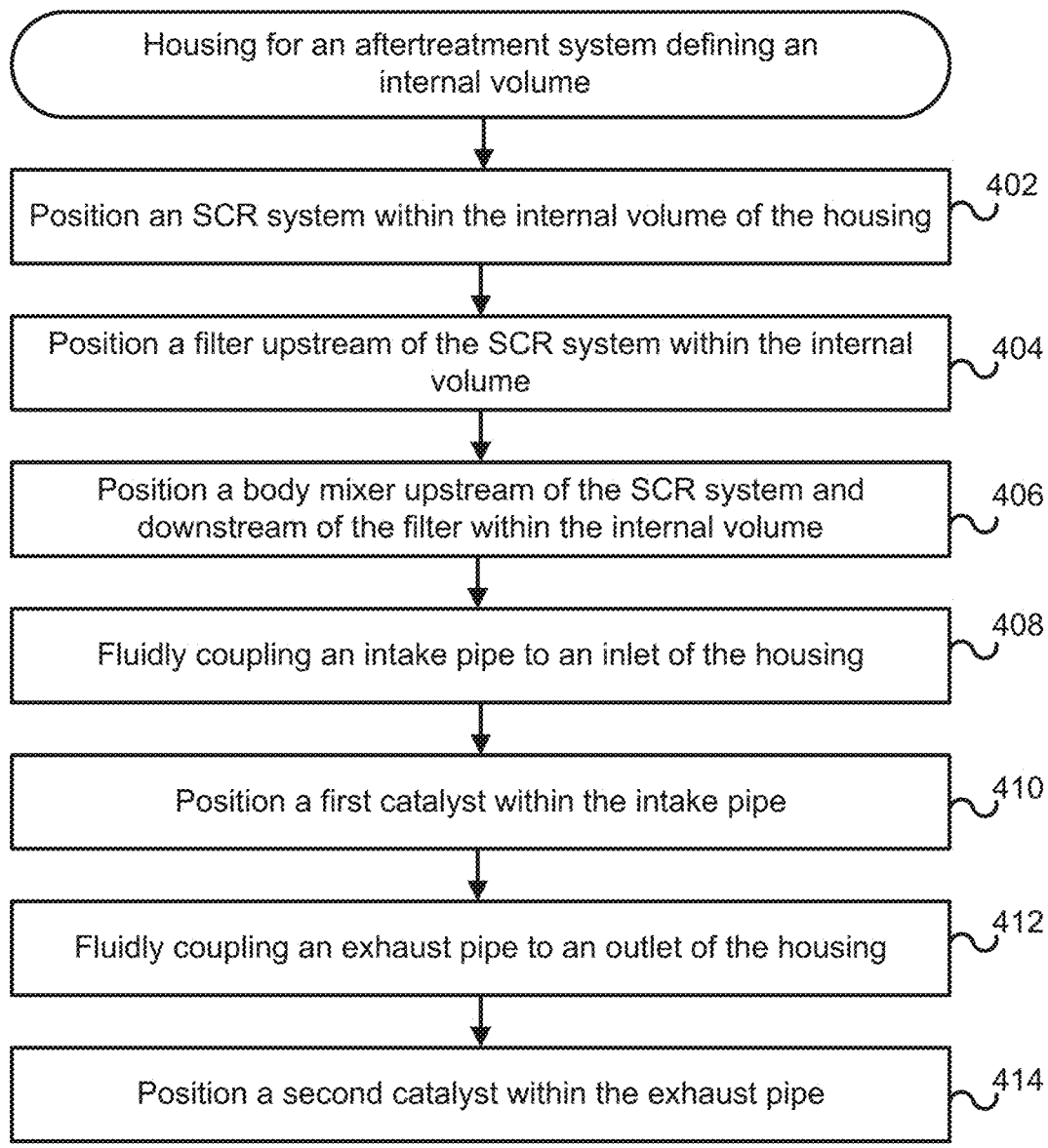

CLOSE COUPLED SINGLE MODULE AFTERTREATMENT SYSTEM

CROSS-REFERENCE TO RELATED APPLICATIONS

This application is a divisional of U.S. patent application Ser. No. 15/539,954, filed Jun. 26, 2017, which is a National stage of PCT Application No. PCT/US2015/067324, filed Dec. 22, 2015, which claims priority to and the benefit of U.S. Provisional Application No. 62/098,653, filed Dec. 31, 2014 and entitled "Close Coupled Single Module Aftertreatment System." The contents of all 3 applications are herein incorporated by reference in their entirety and for all purposes.

TECHNICAL FIELD

The present disclosure relates generally to exhaust aftertreatment systems for use with internal combustion (IC) engines.

BACKGROUND

During the combustion process in an IC engine (e.g., a diesel-powered engine), sulfur is concurrently formed with carbon monoxide (CO) and hydrocarbons (HC) as various sulfur oxides ($SO_x$). Typically, 97-99% of the total amount of $SO_x$ present in exhaust gas includes sulfur dioxide ($SO_2$) and 1-3% includes sulfur trioxide ($SO_3$). Thus, fuels with higher sulfur content tend to produce higher amounts of $SO_3$. For example, fuel with sulfur content of 1000 ppm may form approximately 1-3 ppm $SO_3$.

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines can include a selective catalytic reduction (SCR) catalyst to convert $NO_x$ (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the $SO_x$ and/or the $NO_x$ gases. The reduction byproducts of the exhaust gas are then fluidically communicated to the catalyst included in the SCR aftertreatment system to decompose substantially all of the $SO_x$ and $NO_x$ gases into relatively harmless byproducts which are expelled out of such conventional SCR aftertreatment systems.

Conventional aftertreatment systems can also include one or more catalysts for pretreatment and/or post treatment of the exhaust gas. For example, some conventional aftertreatment systems for treating diesel exhaust gas can also include a diesel oxidation catalyst, and/or an ammonium oxidation catalyst. Other components can also include a filter. Each of these components is disposed in conventional aftertreatment systems within the length constraints of the aftertreatment system imposed by the dimensions (e.g., length) of the machine generating the exhaust gas. While it is desirable that the residence time of the exhaust gas in the SCR system is maximized, length constraints of the aftertreatment can limit the dimensions of the components of the aftertreatment system.

SUMMARY

Embodiments described herein relate generally to exhaust aftertreatment systems for use with IC engines, and in particular to exhaust aftertreatment systems that include a first oxidation catalyst disposed in an intake pipe of the aftertreatment systems.

In a first set of embodiments, an aftertreatment system includes a filtration and reduction unit. The filtration and reduction unit comprises a housing defining an internal volume. A filter is disposed in the internal volume and is configured to substantially remove particulates from the exhaust gas. A selective catalytic reduction system is disposed in the internal volume downstream of the filter and is configured to selectively reduce a portion of the exhaust gas. A first catalyst is formulated to oxidize at least a portion of the exhaust gas. An intake pipe is disposed upstream of the filtration and reduction unit and configured to communicate the exhaust gas o the filtration and reduction unit. The first catalyst is disposed in the intake pipe. An exhaust pipe is disposed downstream of the filtration and reduction unit.

In particular embodiments, the first catalyst can include a diesel oxidation catalyst. In other embodiments, the intake pipe comprises a first intake pipe and a second intake pipe such that the first catalyst is disposed in each of the first intake pipe and the second intake pipe. The aftertreatment system may also include a second catalyst formulated to oxidize an exhaust reductant. The second catalyst can include an ammonium oxidation catalyst. The second catalyst can be disposed in the exhaust pipe.

In another set of embodiments, an aftertreatment system comprises a housing including an inlet, an outlet and defining an internal volume. An intake pipe is fluidly coupled to the inlet. A SCR system is positioned within the internal volume defined by the housing. Furthermore, a first catalyst is positioned within the intake pipe.

In yet another set of embodiments, a method for increasing a space available within a housing of an aftertreatment system which defines an internal volume comprises positioning a selective catalytic reduction system within the internal volume defined by the housing. An intake pipe is fluidly coupled to an inlet of the housing. Furthermore, a first catalyst is positioned within the intake pipe.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 4 is a schematic flow diagram of an example method for increasing a space available within an internal volume defined by a housing of an aftertreatment system, for housing various aftertreatment components therewithin.

Figure 1:
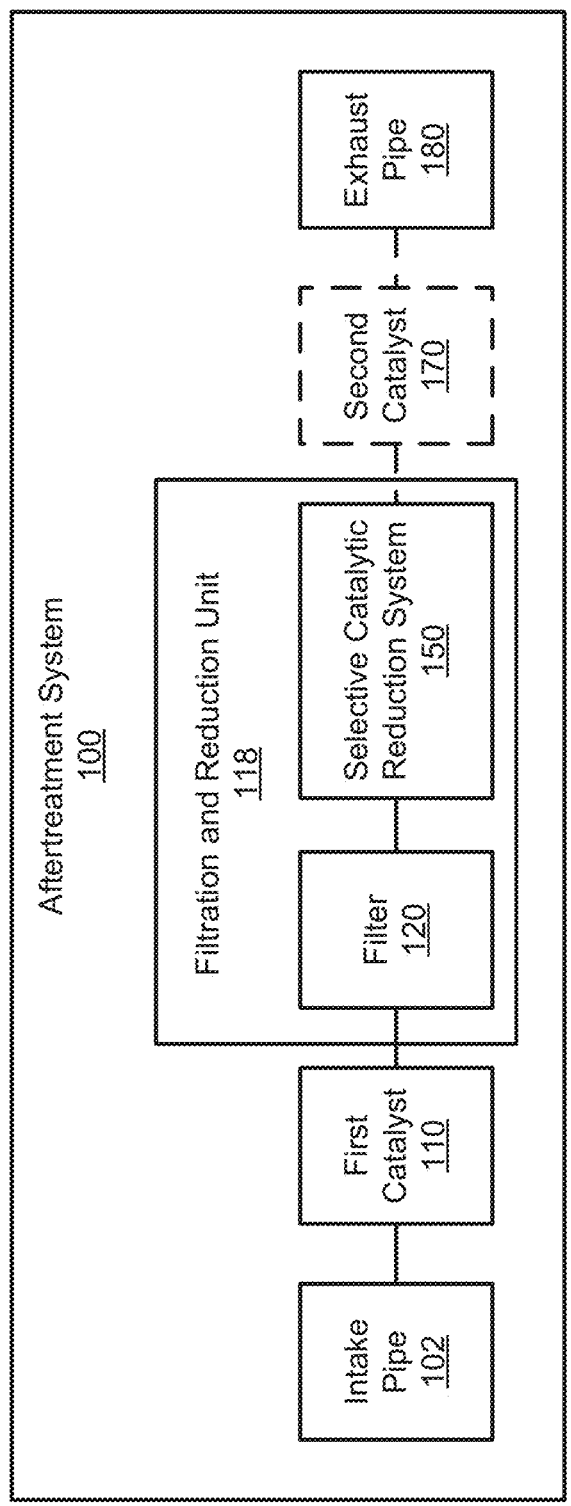
FIG. 1 is a schematic block diagram of an aftertreatment system that includes a first catalyst and optionally, a second catalyst, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to exhaust aftertreatment systems for use with IC engines, and in particular to exhaust aftertreatment systems that include an oxidation catalyst disposed in an intake pipe of the aftertreatment system. Embodiments described herein may provide certain benefits including, for example: (1) disposing a first oxidation catalyst in an intake pipe thereby, allowing more space for an SCR system, filter, and/or a body mixer to be disposed within the aftertreatment system; (2) disposing a second oxidation catalyst in an exhaust pipe thereby providing even more space for disposing the SCR system, filter, and/or the body mixer within the aftertreatment system; (3) allowing increase in the dimensions (e.g., length and/or width) of the SCR system and/or body mixer relative to conventional aftertreatment systems without increasing the overall length of the aftertreatment system; (4) increasing retention time of the exhaust gas or exhaust gas/exhaust reductant mixture within the aftertreatment system which may lead to better mixing, increased efficiency of the SCR catalysts, higher temperatures, less deposits, and/or lower backpressure; (5) reducing heat loss, thereby reducing the amount and cost of insulation; and (6) providing better distribution of particulate matter (e.g., soot) entrained in the exhaust gas flowing through the aftertreatment system.

FIG. 1 shows an aftertreatment system 100 for treating an exhaust gas (e.g., a diesel exhaust gas) produced by an IC engine (e.g., a diesel engine). The aftertreatment system 100 includes an intake pipe 102, a first catalyst 110, a filtration and reduction unit 118 which includes a filter 120 and a selective catalytic reduction (SCR) system 150, and an exhaust pipe 180. The aftertreatment system 100 can optionally, also include a second catalyst 170.

The intake pipe 102 is disposed upstream of the filtration and reduction unit 118. The intake pipe 102 is configured to receive an exhaust gas (e.g., a diesel exhaust gas) from an IC engine (e.g., a diesel engine) and communicate the exhaust gas to the filtration and reduction unit 118. The intake pipe 102 can be made from a strong, rigid, heat and/or corrosion resistant material such as, metals (e.g., stainless steel, aluminum, alloys, etc.), ceramics, any other suitable material or a combination thereof. The intake pipe 102 can have any suitable cross-section, for example, a circular, square, rectangular, polygonal, oval, or any other suitable cross-section.

The first catalyst 110, for example a first oxidation catalyst, is formulated to oxidize at least a portion of the exhaust gas flowing through the first catalyst 120. For example, in some embodiments in which the exhaust gas is a diesel exhaust gas, the first catalyst 120 can include a diesel oxidation catalyst. The diesel oxidation catalyst can be formulated to oxidize carbon monoxide, hydrocarbons, and/or particulate matter included in the exhaust gas flow. Moreover, the diesel oxidation catalyst can be formulated to have a low light-off temperature and/or a high tolerance to sulfur (e.g., $SO_x$ gases included in the exhaust gas). Suitable diesel oxidation catalysts can include, for example, platinum, palladium, aluminum oxide, or a combination thereof.

The first catalyst 110 is disposed within a flow path defined by the intake pipe 102. In one embodiment, the first catalyst 110 can be fixedly disposed in the intake pipe 102. In other embodiments, the first catalyst 110 can be removably disposed in the intake pipe 102, for example, to allow replacement of the first catalyst 110 without replacing the intake pipe 102. In some embodiments, the intake pipe 102 can divide or otherwise split into a plurality of intake pipes each of which are in fluidic communication with the filtration and reduction unit 118. In other words, the intake pipe 102 can divide the flow of exhaust gas into a plurality of portions which are then delivered to the filtration and reduction unit 118. In such embodiments, the first catalyst 110 can be disposed in each of the plurality of intake pipes feeding into the filtration and reduction unit 118. For example, in one embodiment, the intake pipe 102 can divide into a first intake pipe and a second intake pipe and the first catalyst 110 can be disposed in each of the first intake pipe and the second intake pipe.

A plurality of temperature sensors can also be disposed in the intake pipe 102 to measure a temperature of the exhaust gas at various locations within the intake pipe (e.g., before contacting the first catalyst 110, and/or after flowing through the first catalyst 110).

The filtration and reduction unit 118 includes a housing (not shown) defining an internal volume. The housing can be formed from any suitable material, for example, metals or ceramics. The housing can define any suitable cross-section, for example, a circular, square, rectangular, polygonal, elliptical, or any other suitable cross-section.

The filter 120 is disposed within the internal volume defined by the housing. The filter 120 is configured to receive the flow of the exhaust gas (e.g., a diesel exhaust gas) from the intake pipe 102. The filter 120 can include any suitable filter (e.g., a diesel particulate filter) configured to filter and remove any particulates entrained within the exhaust gas flow, and prevent such particulates from entering the SCR system 150. Such particles can include, for example, dust, soot, organic particles, crystals, or any other solid particulates present in the exhaust gas. The filter 120 can include a filter housing made of a strong and rigid material such as, for example, high density polypropylene (HDPP) which can define an internal volume to house a filter element. Any suitable filter element can be used such as, for example, a cotton filter element, an acrylonitrile butadiene styrene (ABS) filter element, any other suitable filter element or a combination thereof. The filter element can have any suitable pore size, for example, about 10 microns, about 5 microns, or about 1 micron.

One or more temperature sensors can be disposed in, or otherwise proximate to the filter 120 (e.g., at an entrance of the filter 120) to measure the temperature of the exhaust gas.

Furthermore, a pressure sensor can also be disposed on the filter 120 to measure any changes in a pressure of the exhaust gas flowing through the filter 120. In some embodiments, the pressure sensor can include a differential pressure sensor positioned across the filter 120 to determine a differential pressure thereacross. In other embodiments, the pressure sensor can include a first pressure sensor positioned upstream of the filter 120 and a second pressure sensor positioned downstream of the filter 120. The first pressure sensor measures a first pressure upstream of the filter 120, and the second pressure sensor measures a second pressure downstream of the filter 120. The difference between the first pressure and the second pressure represents the pressure drop across the filter 120. Change in pressure of the exhaust gas or the pressure drop across the filter 120 can, for example, provide information on the amount of particulate trapped within the filter 110, and/or the remaining life of the filter 110. For example, a change in exhaust gas pressure above a predetermined threshold can indicate that the filter 120 is substantially clogged and should be replaced.

In some embodiments, a body mixer (not shown) can also be included in the aftertreatment system 100. In such embodiments, the body mixer can be disposed within the internal volume defined by the housing. The body mixer can be disposed downstream of the filter 120 and upstream of the SCR system 150, and configured to fluidically couple the filter 120 to the SCR system 150. The body mixer can include a body mixer housing defining an internal volume. An injection port can be disposed on a sidewall of the body mixer housing and configured to communicate an exhaust reductant into the body mixer. In some embodiments, the exhaust gas can include a diesel exhaust gas and the exhaust reductant can include a diesel exhaust fluid. The diesel exhaust fluid can include, urea, an aqueous solution of urea, or any other fluid that includes ammonia, by products, or any other diesel exhaust fluid as is known in the arts (e.g., the diesel exhaust fluid marketed under the name ADBLUE®.

The body mixer can be structured to allow efficient mixing of the exhaust reductant with the exhaust gas before communicating the exhaust gas into the SCR system 150. The body mixer can include any suitable structures such as, for example, passageways, bluffs, vanes, partition walls, or any other features or structures to facilitate the mixing of the exhaust reductant with the exhaust gas.

The SCR system 150 is disposed within the internal volume defined by the housing of the filtration and reduction unit 118. The SCR system 150 is disposed downstream of the filter 120 and is configured to treat an exhaust gas (e.g., a diesel exhaust gas) flowing through the SCR system 150. The SCR system 150 is configured to selectively reduce a portion of the exhaust gas. For example, the exhaust reductant can react with the exhaust gas to at least partially reduce one or more components of the gas (e.g., SOx and NOx), or facilitate reduction of the one or more components in the presence of one or more catalysts included the SCR system 150. One or more temperature sensors can also be disposed in the SCR system 150 to measure a temperature of the exhaust gas.

The SCR system 150 includes one or more catalysts formulated to selectively reduce the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any SOx or NOx gases included in the exhaust gas are further reduced to yield an exhaust gas which is substantially free of carbon monoxide, SOx and NOx gases.

The exhaust pipe 180 is disposed downstream of the filtration and reduction unit 118. The exhaust pipe 180 can be formed from substantially the same materials as the intake pipe 102. The exhaust pipe 180 is configured to receive the treated exhaust gas (or otherwise mixture of treated exhaust gas and any excess exhaust reductant (e.g., urea) or its byproducts (e.g., ammonia)), and deliver it to the external environment. One or more sensors can also be disposed in the exhaust pipe 180 to measure a concentration of one or more components of the exhaust gas. For example, in some embodiments in which the exhaust gas includes a diesel exhaust gas, NOx sensors, SOx sensors, and/or exhaust reductant (e.g., ammonia) sensors can be disposed in the exhaust pipe 180.

In some embodiments, the aftertreatment system 100 can also include a second catalyst 170 (e.g., a second oxidation catalyst). In one embodiment, the second catalyst 170 can be disposed downstream of the SCR system 150 within the internal volume defined by the housing of the filtration and reduction unit 118, and upstream of the exhaust pipe 180. In other embodiments, the second catalyst 170 can be disposed within the exhaust pipe 180.

The second catalyst 170 can be formulated to oxidize any excess exhaust reductant included in the exhaust gas exiting the SCR system 150. For example, the exhaust reductant can be a diesel exhaust fluid (e.g., an aqueous solution of urea as described herein) that provides a source of ammonia for participating in the selective catalytic reduction within the SCR system 150. In such embodiments, the second catalyst 170 can include an ammonium oxidation catalyst formulated to oxidize ammonia to nitrogen. Suitable catalysts can include platinum, palladium, iridium, ruthenium, silver, metal oxides (e.g., $Co_3O_4$, $MnO_2$, $V_2O_5$, etc.), Ni, Fe, and/or Mn supported on $Al_2O_3$, $CuO/Al_2O_3$, $Fe_2O_3/Al_2O_3$, $Fe_2O_3/TiO_2$, $Fe_2O_3/ZrO_2$, zeolites (e.g., mordenite, ferrierite, chabazite) any other suitable ammonia oxidation catalyst or a combination thereof.

As described herein, the first catalyst 110 is disposed in the intake pipe 102. Furthermore, the second catalyst 170 can also be disposed in the exhaust pipe 180. This can enable a dimension (e.g., a length) of the filtration and reduction unit 118 (e.g., the housing of the filtration and reduction unit 118, or a length of the filter 120 and/or the SCR system 150) to be increased without increasing the overall dimension (e.g., length) of the housing of the filtration and reduction unit 118 of the aftertreatment system 100.

The distance between an outlet of the intake pipe (i.e., the end coupled to the housing of the aftertreatment system 100) and an inlet of the exhaust pipe (i.e., the end coupled to the housing of the aftertreatment system 100) defines the length of a body of an aftertreatment system, for example the housing of the filtration and reduction unit 118. In conventional aftertreatment systems, each component of the aftertreatment system, for example, a first catalyst (e.g., a diesel oxidation catalyst), a filter (e.g., a diesel particulate filter), a mixer, an SCR system, and/or the second catalyst (e.g., an ammonium oxidation catalyst) are disposed between the intake pipe and the exhaust pipe. This creates a limit on the length of the SCR system, the filter, and the body mixer.

In contrast, the aftertreatment system 100 allows for the first catalyst 110 to be disposed within the intake pipe 102 and the second catalyst 170 to be disposed within the exhaust pipe 180. In this manner, the distance between the outlet of the intake pipe 102, and the inlet of the exhaust pipe 180 remains the same but now the entire length of the housing of the filtration and reduction unit 118 is available for disposing the filter 120, body mixer and the SCR system 150. This, enables a length of the filtration and reduction unit 118 (i.e., the length of the SCR system 150, the body mixer, and/or the filter 110) to be increased relative to conventional aftertreatment systems.

The increased length can increase the residence time of the exhaust gas (or otherwise a mixture of the exhaust gas and the exhaust reductant) within the filter 110, the body mixer, and/or the SCR system 150. The increased residence time can provide several benefits, for example, more efficient mixing of the exhaust reductant with the exhaust gas, more efficient reduction of the SOx and/or NOx gases included in the exhaust gas (e.g., diesel exhaust gas), increased temperature, and/or reduced backpressure. Furthermore, positioning the first catalyst 110 in the intake pipe 102 can prevent heat loss by allowing utilization of the heat of the oxidation reaction taking place within or on the first catalyst 110 (e.g., within pores defined by the first catalyst 110 or on a surface of the first catalyst 110).

Figure 2:
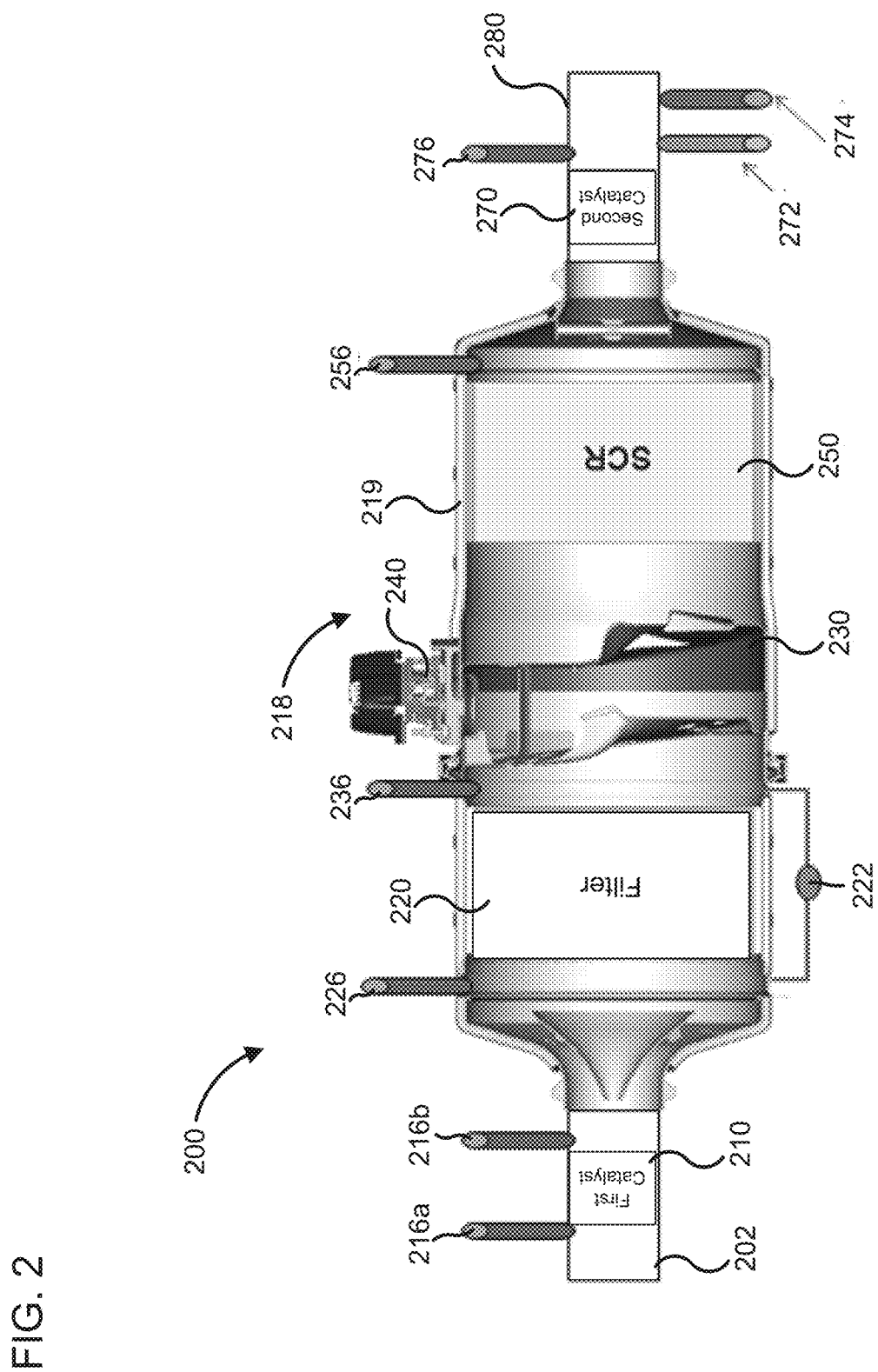
FIG. 2 is a side cross-section view of an aftertreatment system, according to another embodiment.

FIG. 2 is side cross-sectional view of an aftertreatment system 200 which can be used for treating an exhaust gas (e.g., a diesel exhaust gas) produced by an IC engine (e.g., a diesel engine). The aftertreatment system 200 includes an intake pipe 202, a first catalyst 210, a filtration and reduction unit 218 that includes a filter 220, a body mixer 230 and a SCR system 250, a second catalyst 270, and an exhaust pipe 280.

The intake pipe 202 is disposed upstream of the filtration and reduction unit 218, and is configured to receive an exhaust gas (e.g., a diesel exhaust gas) from an IC engine (e.g., a diesel engine) and communicate the exhaust gas to the filter 220. The intake pipe 202 can be made from a strong, rigid, heat and/or corrosion resistant material such as, metals (e.g., stainless steel, aluminum, alloys, etc.), ceramics, any other suitable material or a combination thereof. The intake pipe 202 can have any suitable cross-section, for example, a circular, square, rectangular, polygonal, oval, or any other suitable cross-section.

The first catalyst 210 is formulated to oxidize at least a portion of the exhaust gas flowing through the first catalyst 210. For example, in some embodiments in which the exhaust gas is a diesel exhaust gas, the first catalyst 210 can include a diesel oxidation catalyst. The diesel oxidation catalyst can be formulated to oxidize carbon monoxide, hydrocarbons, and/or particulate matter included in the exhaust gas flow. Moreover, the diesel oxidation catalyst can be formulated to have low light-off temperature and high tolerance to sulfur (e.g., SOx gases included in the exhaust gas). Suitable diesel oxidation catalysts can include, for example, platinum, palladium, aluminum oxide, or a combination thereof.

As shown in FIG. 2, the first catalyst 210 is disposed within a flow path defined by the intake pipe 202. The first catalyst 210 can be fixedly or removably disposed within the flow path, for example, to allow replacement of the first catalyst 210 without replacing the intake pipe 202. A first temperature sensor 216a is disposed in the intake pipe 202 upstream of the first catalyst 210, and a second temperature sensor 216b is also disposed in the intake pipe 202 downstream of the first catalyst 210. The first temperature sensor 216a and the second temperature sensor 216b are configured to measure the temperature of the exhaust gas entering the intake pipe 202, and exiting the intake pipe 202 after flowing through the first catalyst 210, respectively.

The filtration and reduction unit 218 includes a housing 219 defining an internal volume. The housing 219 can be formed from any suitable material, for example, metals or ceramics. Moreover, the housing 219 can define any suitable cross-section, for example, a circular, square, rectangular, polygonal, elliptical, or any other suitable cross-section.

The filter 220 is disposed within the internal volume defined by the housing 219. The filter 220 is disposed downstream of the intake pipe 202 and upstream of the body mixer 230. The filter 220 is configured to receive the flow of the exhaust gas (e.g., a diesel exhaust gas) from the intake pipe 202. The filter 220 can include any suitable filter (e.g., a diesel particulate filter) configured to filter and remove any particulates entrained within the exhaust gas flow, and prevent such particulates from entering the SCR system 250. Such particles can include, for example, dust, soot, organic particles, crystals, or any other solid particulates present in the exhaust gas. The filter 220 can include a filter housing made of a strong and rigid material such as, for example, high density polypropylene (HDPP) which can define an internal volume to house a filter element. Any suitable filter element can be used such as, for example, a cotton filter element, an acrylonitrile butadiene styrene (ABS) filter element, any other suitable filter element or a combination thereof. The filter element can have any suitable pore size, for example, about 10 microns, about 5 microns, or about 1 micron.

A temperature sensor 226 is disposed proximate to an inlet of the filter 220 and configured to measure a temperature of the exhaust gas flowing into the filter 220. A pressure sensor 222 is positioned across the filter 220 and can include, for example a differential pressure sensor. The pressure sensor 222 is configured to measure a differential pressure or pressure drop of the exhaust gas flowing across the filter 220. The pressure sensor 222 can, for example, be used to determine a performance efficiency or otherwise life remaining of the filter 220. For example, a drop in pressure of the exhaust gas above a predetermined threshold can indicate that the filter 220 is clogged and/or needs replacement.

The body mixer 230 is disposed within the internal volume defined by the housing 219 downstream of the filter 220 and upstream of the SCR system 250, and fluidically couples the filter 220 to the SCR system 250. The body mixer 230 can include a body mixer housing defining an internal volume. An injection port 240 is disposed on a sidewall of the body mixer 230 and configured to communicate an exhaust reductant into the body mixer 230. In some embodiments, the exhaust gas can include a diesel exhaust gas and the exhaust reductant can include a diesel exhaust fluid. The diesel exhaust fluid can include, urea, an aqueous solution of urea, or any other fluid that includes ammonia, by products, or any other diesel exhaust fluid as is known in the arts (e.g., the diesel exhaust fluid marketed under the name ADBLUE®. A temperature sensor 236 is disposed proximate to an inlet of the body mixer 230. The temperature sensor 236 can be configured to measure a temperature of the exhaust gas flowing into the body mixer 230.

The body mixer 230 is structured to allow efficient mixing of the exhaust reductant with the exhaust gas before communicating the exhaust gas into the SCR system 250. The body mixer 230 can include any suitable structures such as, for example, passageways, bluffs, vanes, partition walls, or any other features or structures to facilitate the mixing of the reductant with the exhaust gas, increase retention time, increase temperature, reduce exhaust reductant deposits, and/or reduce backpressure.

The SCR system 250 is disposed within the internal volume defined by the housing 219 downstream of the body mixer 230 and is configured to treat an exhaust gas (e.g., a diesel exhaust gas) flowing through the SCR system 250. The SCR system 250 is configured to selectively reduce a portion of the exhaust gas. For example, the exhaust reductant reacts with the exhaust gas in presence of the catalysts included in the SCR system 250 to at least partially reduce one or more components of the gas (e.g., SOx and/or NOx gases), or facilitate reduction of the one or more components in the presence of one or more catalysts. A temperature sensor 256 is disposed proximate to an outlet of the SCR system 250. The temperature sensor 256 can be configured to measure a temperature of the exhaust gas flowing out of the filtration and reduction unit 218 into the exhaust pipe 280.

The SCR system 250 includes one or more catalysts formulated to selectively reduce the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any SOx or NOx gases included in the exhaust gas are further reduced to yield an exhaust gas which is substantially free of carbon monoxide, SOx and NOx gases.

The exhaust pipe 280 is disposed downstream of the filtration and reduction unit 218. The exhaust pipe 280 can be formed from substantially the same materials as the intake pipe 202. The exhaust pipe 280 is configured to receive the treated exhaust gas (or otherwise mixture of treated exhaust gas and any excess exhaust reductant (e.g., urea) or its byproducts (e.g., ammonia), and deliver it to the external environment.

The second catalyst 270 is disposed within the exhaust pipe 280. The second catalyst 270 can be configured to oxidize any excess exhaust reductant remaining in the exhaust gas exiting the SCR system 250.

In some embodiments, the exhaust reductant can be a diesel exhaust fluid (e.g., an aqueous solution of urea as described herein) that provides a source of ammonia for participating in the selective catalytic reduction within the SCR system 250. In such embodiments, the second catalyst 270 can include an ammonium oxidation catalyst formulated to oxidize ammonia to nitrogen. Suitable catalysts can include platinum, palladium, iridium, ruthenium, silver, metal oxides (e.g., $Co_3O_4$, $MnO_2$, $V_2O_5$, etc.), Ni, Fe, and/or Mn supported on $Al_2O_3$, $CuO/Al_2O_3$, $Fe_2O_3/Al_2O_3$, $Fe_2O_3/TiO_2$, $Fe_2O_3/ZrO_2$, zeolites (e.g., mordenite, ferrierite, chabazite), any other suitable ammonia oxidation catalyst or a combination thereof.

A temperature sensor 276 is disposed within the exhaust pipe 280 and configured to measure a temperature of the exhaust gas exiting the exhaust pipe 280 after flowing through the second catalyst 270. Furthermore, a first gas sensor 272 and a second gas sensor 274 are also disposed in the exhaust pipe 280, which can be configured to measure a concentration of a portion of a gas included in the exhaust gas exiting the exhaust pipe 280. In some embodiments, the exhaust gas can be a diesel exhaust gas. In such embodiments, the first gas sensor 272 can include a NOx sensor and/or a SOx sensor, configured to measure a concentration of NOx and/or SOx gases included in the exhaust gas exiting the exhaust pipe 280. Moreover, the second gas sensor 274 can include an ammonia sensor configured to measure a concentration of ammonia in the exhaust gas (e.g., a breakdown product of a diesel exhaust fluid such as urea).

As described herein, the first catalyst 210 is disposed in the intake pipe 202, and the second catalyst 270 is disposed in the exhaust pipe 280. This can enable a dimension (e.g., a length) of the SCR system 250, the body mixer 230, and/or the filter 220 to be increased without increasing the overall dimension (e.g., length) of the filtration and reduction unit 218. In this manner, the filtration and reduction unit 218 can provide increased retention time of the exhaust gas, higher temperature of the exhaust gas, more effective removal of NOx and SOx gases from the exhaust gas, and/or reduced backpressure.

Figure 3:
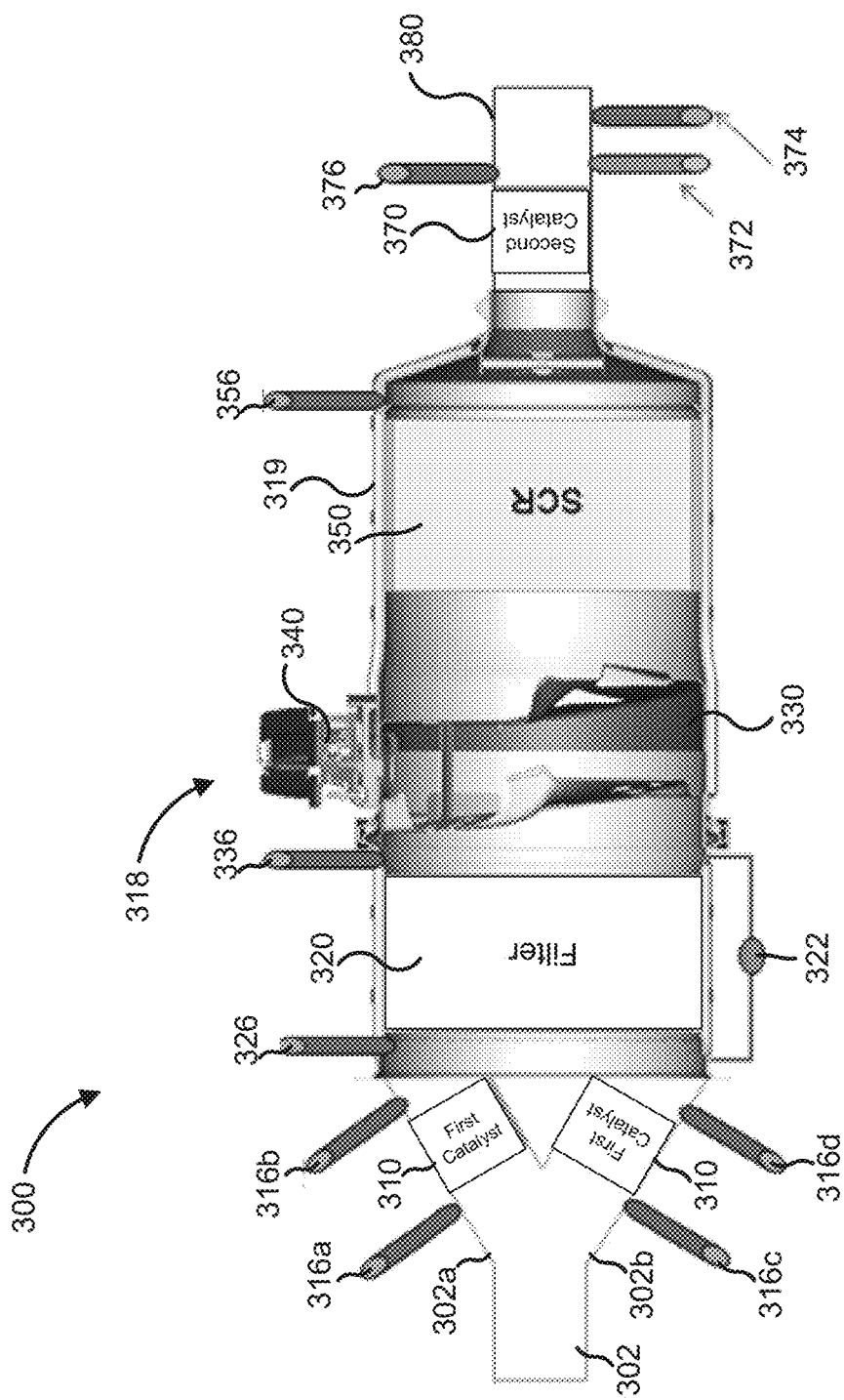
FIG. 3 is a side cross-section view of an aftertreatment system, according to yet another embodiment.

FIG. 3 is side cross-section view of another embodiment of an aftertreatment system 300 which can be used for treating an exhaust gas (e.g., a diesel exhaust gas) produced by an IC engine (e.g., a diesel engine). The aftertreatment system 300 includes an intake pipe 302, a first catalyst 310, a filtration and reduction unit 318 that includes a filter 320, a body mixer 330 and a SCR system 350, a second catalyst 370, and an exhaust pipe 380.

The intake pipe 302 is disposed upstream of the filtration and reduction unit 318, and is configured to receive an exhaust gas (e.g., a diesel exhaust gas) from an IC engine (e.g., a diesel engine) and communicate the exhaust gas to the filtration and reduction unit 318. The intake pipe 302 can be made from a strong, rigid, heat and/or corrosion resistant material such as, metals (e.g., stainless steel, aluminum, alloys, etc.), ceramics, any other suitable material or a combination thereof. The intake pipe 302 can have any suitable cross-section, for example, a circular, square, rectangular, polygonal, oval, or any other suitable cross-section.

The intake pipe 302 divides at a Y joint into a first intake pipe 302a and a second intake pipe 302b. The first intake pipe 302a and the second intake pipe 302b are configured to divide the intake flow of exhaust gas into a first intake flow and a second intake flow, which are subsequently communicated to the filtration and reduction unit 318.

The first catalyst 310 is disposed in a first flow path defined by the first intake pipe 302a, and also in a second flow path defined by the second intake pipe 302b. The first catalyst 310 is formulated to oxidize at least a portion of the exhaust gas flowing through the first intake pipe 302a and the second intake pipe 302b. For example, in some embodiments in which the exhaust gas is a diesel exhaust gas, the first catalyst 310 can include a diesel oxidation catalyst. The diesel oxidation catalyst can be formulated to oxidize carbon monoxide, hydrocarbons, and/or particulate matter included in the exhaust gas flow. Moreover, the diesel oxidation catalyst can be formulated to have low light-off temperature and high tolerance to sulfur (e.g., SOx gases included in the exhaust gas). Suitable diesel oxidation catalysts can include, for example, platinum, palladium, aluminum oxide, or a combination thereof A first temperature sensor 316a is disposed in the first intake pipe 302a upstream of the first catalyst 310, and a second temperature sensor 316b is disposed in the first intake pipe 302a downstream of the first catalyst 310.

Furthermore, a third temperature sensor 316c is disposed in the second intake pipe 302b upstream of the first catalyst 310, and a fourth temperature sensor 316d is also disposed in the second intake pipe 302b downstream of the first catalyst 310. The first temperature sensor 316a and the second temperature sensor 316b are configured to measure the temperature of the exhaust gas entering the first intake pipe 302a, and exiting the first intake pipe 302a after flowing through the first catalyst 310, respectively. Similarly, the third temperature sensor 316c and the fourth temperature sensor 316d are configured to measure the temperature of the exhaust gas entering the second intake pipe 302b, and exiting the second intake pipe 302b after flowing through the first catalyst 310, respectively.

While shown as dividing into the first intake pipe 302a and the second intake pipe 302b, the intake pipe 302 can be divided or otherwise split into any number of intake pipes for dividing the intake flow of exhaust gas into a plurality of intake flows. Dividing the flow can, for example, reduce the backpressure of the exhaust gas, or allow more efficient interaction of the intake flow with the first catalyst 310.

The filtration and reduction unit 318 includes a housing 319 defining an internal volume. The housing 319 can be substantially similar to the housing 219 described with respect to the aftertreatment system 200 and therefore, not described in further detail herein.

The filter 320 is disposed within the internal volume defined by the housing 319 upstream of the body mixer 330. The filter 320 is configured to receive the flow of the exhaust gas (e.g., a diesel exhaust gas) from the first intake pipe 302a and the second intake pipe 302b, and substantially remove particulates from the exhaust gas. The filter 320 can be substantially similar to the filter 220 described with respect to the aftertreatment system 200 and therefore, not described in further detail herein.

A temperature sensor 326 is disposed proximate to an inlet of the filter 320 and configured to measure a temperature of the exhaust gas flowing into the filter 320. A pressure sensor 322, for example a differential pressure sensor, is also disposed across the filter 320. The pressure sensor 322 can be configured to measure a pressure difference of the exhaust gas flowing across the filter 320. The pressure sensor 322 can, for example, be used to determine performance efficiency or otherwise remaining life of the filter 320. For example, a drop in pressure of the exhaust gas above a predetermined threshold can indicate that the filter 320 is clogged and/or needs replacement.

The body mixer 330 is disposed within the internal volume defined by the housing 319 downstream of the filter 320 and upstream of the SCR system 350, and fluidically couples the filter 320 to the SCR system 350. The body mixer 230 can include a body mixer housing defining an internal volume. An injection port 340 is disposed on a sidewall of the body mixer 330 and configured to communicate an exhaust reductant into the body mixer 330.

In some embodiments, the exhaust gas can include a diesel exhaust gas and the exhaust reductant can include a diesel exhaust fluid. The diesel exhaust fluid can include urea, an aqueous solution of urea, or any other fluid that includes ammonia, by products, or any other diesel exhaust fluid as is known in the arts (e.g., the diesel exhaust fluid marketed under the name ADBLUE®). A temperature sensor 336 is disposed proximate to an inlet of the body mixer 330. The temperature sensor 336 can be configured to measure a temperature of the exhaust gas flowing into the body mixer 330.

The body mixer 330 is structured to allow efficient mixing of the exhaust reductant with the exhaust gas before communicating the exhaust gas into the SCR system 350. The body mixer 330 can include any suitable structures such as, for example, passageways, bluffs, vanes, partition walls, or any other features or structures to facilitate the mixing of the reductant with the exhaust gas, increase retention time, increase temperature, reduce exhaust reductant deposits, and/or reduce backpressure.

The SCR system 350 is disposed within the internal volume defined by the housing 319 downstream of the body mixer 330 and is configured to treat an exhaust gas (e.g., a diesel exhaust gas) flowing through the SCR system 350. The SCR system 350 is configured to selectively reduce a portion of the exhaust gas. The SCR system 350 can be substantially similar to the SCR system 250 described herein with respect to the aftertreatment system 200 and therefore, not described in further detail herein. A temperature sensor 356 is disposed proximate to an outlet of the SCR system 350. The temperature sensor 356 can be configured to measure a temperature of the exhaust gas flowing out of the SCR system into the exhaust pipe 380.

The exhaust pipe 380 is disposed downstream of the filtration and reduction unit 318. The exhaust pipe 380 can be formed from substantially the same materials as the intake pipe 302. The exhaust pipe 380 is configured to receive the treated exhaust gas (or otherwise mixture of treated exhaust gas and any excess exhaust reductant (e.g., urea) or its byproducts (e.g., ammonia), and deliver it to the external environment. The second catalyst 370 is disposed within the exhaust pipe 380. The second catalyst 370 can be configured to oxidize any excess exhaust reductant remaining in the exhaust gas exiting the SCR system 350.

In some embodiments, the exhaust reductant can be a diesel exhaust fluid (e.g., an aqueous solution of urea as described herein) that provides a source of ammonia for participating in the selective catalytic reduction within the SCR system 350. In such embodiments, the second catalyst 370 can include an ammonium oxidation catalyst formulated to oxidize ammonia to nitrogen, as described herein with respect to the second catalyst 270 included in the aftertreatment system 200.

A temperature sensor 376 is disposed within the intake pipe 302 and is configured to measure a temperature of the exhaust gas exiting the exhaust pipe 380 after flowing through the second catalyst 370. Furthermore, a first gas sensor 372, and a second gas sensor 374 are also disposed in the exhaust pipe 380, and can be configured to measure a concentration of a portion of a gas included in the exhaust gas exiting the exhaust pipe 380. In some embodiment, the exhaust gas can be a diesel exhaust gas. In such embodiments, the first gas sensor 372 can include a NOx sensor and/or a SOx sensor, configured to measure a concentration of NOx and/or SOx gases included in the exhaust gas exiting the exhaust pipe 380. Moreover, the second gas sensor 374 can include an ammonia sensor configured to measure a concentration of ammonia in the exhaust gas (e.g., a breakdown product of a diesel exhaust fluid such as urea).

In some embodiments, a portion of the exhaust pipe 380 proximate to the filtration and reduction unit 318 can also be divided or otherwise split into a plurality of exhaust pipes. For example, two, three or even more exhaust pipes can be coupled to an outlet of the filtration and reduction unit 318, and configured to receive a portion of the treated exhaust gas from the SCR system 350. The plurality of exhaust pipes can then merge together at the exhaust pipe 380. In such embodiments, second catalyst 370 can be disposed in each of the plurality of exhaust pipes.

FIG. 4 is a schematic flow diagram of an example method 400 for increasing a space available within an internal volume defined by a housing (e.g., the housing 219/319) of an aftertreatment system (e.g., the aftertreatment system 100/200/300). The larger space available within the internal volume defined by the housing allows increase in dimensions of a SCR system (e.g., the SCR system 150/250/350), a filter (e.g., the filter 120/220/320) and/or a body mixer (e.g., the body mixer (e.g., the body mixer 230/330) positionable within the internal volume defined by the housing 219/319 or any other housing described herein.

The method 400 includes positioning an SCR system within the internal volume of the housing at 402. For example, the SCR system 150/250/350 or otherwise a SCR catalyst is positioned within the internal volume defined by the housing 219/319 or any other housing described herein. In some embodiments, a filter is positioned upstream of the SCR system within the internal defined by the housing at 404. For example, the filter 120/220/320 is positioned upstream of the SCR system within the internal volume of the housing 219/319 or any other housing described herein so that the filter 120/220/320 is positioned proximate to the inlet and the SCR system is positioned proximate to an outlet of the housing 219/319 or any other housing described herein. In particular embodiments, the method 400 can also include positioning a differential pressure sensor (e.g., the differential pressure sensor 222/322) across the filter 120/220/320.

In particular embodiments, a body mixer is positioned upstream of the SCR system and downstream of the filter within the internal volume defined by the housing at 406. For example, the body mixer 230/330 is positioned between the filter 120/220/320 and the SCR system 150/250/350 within the internal volume of the housing 219/319 or any other housing described herein. The body mixer 230/330 can be structured to receive a reductant, for example via an insertion unit (e.g. a reductant injector) fluidly coupled to the housing 219/319 or any other housing described herein, and facilitate mixing of the reductant with an exhaust gas (e.g., a diesel exhaust gas) flowing through the aftertreatment system 100/200/300.

An intake pipe is fluidly coupled to an inlet of the housing at 408. For example, the intake pipe 102/202/302 is fluidly coupled to an inlet of the housing 219/319 or any other housing described herein. A first catalyst is positioned within the intake pipe at 410. For example, the first catalyst 110/210/310 is positioned within the intake pipe 102/202/302. In particular embodiments, the intake pipe (e.g., the intake pipe 302) may be divided into a plurality of intake pipes fluidly coupled to the inlet of the housing 219/319 or any other housing described herein. In such embodiments, the first catalyst 110/210/310 is positioned within each of the plurality of intake pipes. In some embodiments, the first catalyst 110/210/310 includes a diesel oxidation catalyst, as described herein.

In some embodiments, the method 400 also includes coupling an exhaust pipe to an outlet of the housing at 412. For example, the exhaust pipe 180/280/380 is coupled to an outlet of the housing 219/319 or any other housing described herein. A second catalyst may be positioned within the exhaust pipe at 414. For example, the second catalyst 170/270/370 may be positioned within the exhaust pipe 180/280/380. In various embodiments, the second catalyst 170/270/370 includes an ammonia oxidation catalyst.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" or "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variations of a subcombination.

What is claimed is:

1. An aftertreatment system, comprising:
    a housing including an inlet, an outlet and defining an internal volume;
    an intake pipe disposed upstream of the housing and fluidly coupled to the inlet, and a downstream portion of the intake pipe dividing into a plurality of intake pipes, a downstream end of each of the plurality of intake pipes coupled to the housing;
    a selective catalytic reduction system positioned within the internal volume defined by the housing; and a plurality of first catalysts formulated to oxidize at least a portion of the exhaust gas, each of the first catalysts disposed in a respective one of the plurality of intake pipes.

2. The aftertreatment system of claim 1, further comprising:
a filter positioned within the internal volume defined by the housing, the filter positioned upstream of the selective catalytic reduction system.

3. The aftertreatment system of claim 2, further comprising:
a body mixer positioned downstream of the filter and upstream of the selective catalytic reduction system within the internal volume defined by the housing, the body mixer structured to mix a reductant with an exhaust gas flowing through the aftertreatment system.

4. The aftertreatment system of claim 2, further comprising a differential pressure sensor positioned across the filter.

5. The aftertreatment system of claim 1, wherein the first catalyst comprises a diesel oxidation catalyst.

6. The aftertreatment system of claim 1, further comprising:
an exhaust pipe fluidly coupled to the outlet of the housing; and
a second catalyst positioned within the exhaust pipe.

7. The aftertreatment system of claim 6, wherein the second catalyst comprises an ammonia oxidation catalyst.

8. The aftertreatment system of claim 7, wherein at least one of a NOx sensor and an ammonia sensor are operatively coupled to the exhaust pipe downstream of the second catalyst.

9. The aftertreatment system of claim 1, wherein each of the first catalyst has a first radial cross-sectional dimension that is smaller than a second radial cross-sectional dimension of the housing.

10. The aftertreatment system of claim 1, wherein the upstream portion of the intake pipe has a first radial cross-sectional dimension, the housing has a second radial cross-sectional dimension that is larger than the first radial cross-sectional dimension, and a radial cross-sectional dimension of the aftertreatment system consistently increases in a downstream direction from the first radial cross-sectional dimension to the second radial cross-sectional dimension.

11. The aftertreatment system of claim 1, wherein each of the first catalyst is removably positioned within the respective intake pipe so as to allow removal of the first catalyst from the respective intake pipe without removing the intake pipe from the aftertreatment system.

12. The aftertreatment system of claim 1, further comprising:
a first temperature sensor disposed in each of the plurality of intake pipes upstream of each of the first catalyst; and
a second temperature sensor disposed in each of the plurality of intake pipes downstream of each of the first catalyst.

13. The aftertreatment system of claim 1, wherein:
each of the first catalyst has an upstream end that is downstream of an upstream end of the respective one of the plurality of intake pipes, and
each of the first catalyst has a downstream end that is upstream of a downstream end of the respective one of the plurality of intake pipes that is coupled to the inlet of the housing.

* * * * *